(12) United States Patent
Cowdrey et al.

(10) Patent No.: US 6,895,437 B1
(45) Date of Patent: May 17, 2005

(54) SYSTEM FOR MONITORING BROWSING ACTIVITY OF A VISITOR AND DECREMENTING A REFERENCE COUNT UPON A WEB PAGE CHANGE FOR AUTOMATIC UNLOADING A CLIENT PROGRAM

(75) Inventors: Russell P. Cowdrey, Coppell, TX (US); Jason H. Cone, Irving, TX (US); Brad S. Cranford, Irving, TX (US); Herschel A. Richard, Arlington, TX (US); Nolan E. Barkhouse, Irving, TX (US); Jeffrey G. Schueler, Irving, TX (US)

(73) Assignee: Usability Sciences Corporation, Irving, TX (US)

( * ) Notice: Subject to any disclaimer, the term of this patent is extended or adjusted under 35 U.S.C. 154(b) by 719 days.

(21) Appl. No.: 09/656,812

(22) Filed: Sep. 7, 2000

(51) Int. Cl.[7] ............................................. G06F 15/173
(52) U.S. Cl. ........................................ 709/224; 709/202
(58) Field of Search ................................ 709/224, 202, 709/316; 710/200; 705/10; 719/316

(56) References Cited

U.S. PATENT DOCUMENTS

| | | | | |
|---|---|---|---|---|
| 5,796,952 A | * | 8/1998 | Davis et al. ................. | 709/224 |
| 5,848,396 A | * | 12/1998 | Gerace ......................... | 705/10 |
| 6,412,020 B1 | * | 6/2002 | Leach et al. ................. | 719/316 |
| 6,546,443 B1 | * | 4/2003 | Kakivaya et al. ........... | 710/200 |
| 6,629,153 B1 | * | 9/2003 | Gupta et al. ................. | 709/316 |

OTHER PUBLICATIONS

Orfali et al. "The Essential Distributed Objects Survival Guide", 1996, John Wiley & Sons, Inc., p. 444.*
Article entitled "WordPerfect Presentations 2.0" from Windows Magazine, May 1994.
Article entitled "QuickTutors 95 keeps users productive as they master Microsoft's upgrade", under First Look section of Infoworld Magazine, vol. 17, Issue 31, Jul. 31, 1995.
Developers Guide for QuickTutors 95 entitled "Where Do You Want To Go Today?, A Revolutionary Help and Training Product", developed by Usability Sciences Corporation, Published before Sep. 7, 1999.
Developers Guide for QuickTutors 95 entitled "Why QuickTutors 95?, A Product Your Users Can't Afford To Be Without", developed by Usability Science Corporation, Published before Sep. 7, 1999.
Developers Guide for QuickTutors 95 entitled "QuickTutors®, A Usability Sciences Product Offering", developed by Usability Sciences Corporation, Published before Sep. 7, 1999.
Developers Guide for QuickTutors 95 entitled "QuickTutors 95 Development Kit", developed by Usability Sciences Corporation, Published before Sep. 7, 1999.
Presentation regarding Web Wizard developed by Usability Sciences Corporation, Published before Sep. 7, 1999.
Article entitled "Do cryptic sites equal lost opportunities?" dated Apr. 28, 2000 from The Tech Insider, on Vividence, May 1, 2000.

(Continued)

Primary Examiner—Le Hien Luu
(74) Attorney, Agent, or Firm—Baker Botts L.L.P.

(57) ABSTRACT

A client-side application method for client activities of a visitor to a Web site include loading a client program into an operating environment of a client machine of a visitor to a Web site. A reference count associated with the client program is incremented to maintain persistence of the client program in the operating environment during browsing by the visitor across a plurality of Web pages of the Web site. Browsing activity of the visitor across the Web pages is monitored with the client program. An indication of the browsing activity of the visitor is uploaded over a network for processing.

21 Claims, 17 Drawing Sheets

OTHER PUBLICATIONS

Information on products from Vividence Corporation printed from web site www.Vividence.com, Sep. 8, 2000.

Marketing materials from WordPerfect Presentations, Version 2.0, 1993.

Patent Application entitled "Client–Side Application and Method for Monitoring Activities of a Vistor to a Web Site", U.S. Appl. No. 09/656,812, pending (068307.0106), Filed Sep. 7, 2000.

"Managing a COM Object's Lifetime," *Microsoft Corporation*, msn.microsoft.com at Internet, Aug. 30, 2002, 2 pages, Aug. 2002.

Sara Williams and Charlie Kindel, "The Component Object Model: A Technical Overview," *Microsoft Corporation*, msn.microsoft.com at Internet, Oct. 1994, 16 pages, Oct. 1994.

"Microsoft Component Services: Server Operating System, A Technical Overview," *Microsoft Corporation*, msn.microsoft.com at Internet, Aug. 15, 1998, 7 pages, Aug. 15, 1998.

U.S. Appl. No. 09/658,811, entitled *Method and System for Gathering Feedback from Visitors to a Network Site*, filed Sep. 7, 2000, inventors Russell P. Cowdrey, et al, 40 pages of Specification, Claims and Abstract, and 17 sheets of drawings, Sep. 7, 2000.

* cited by examiner

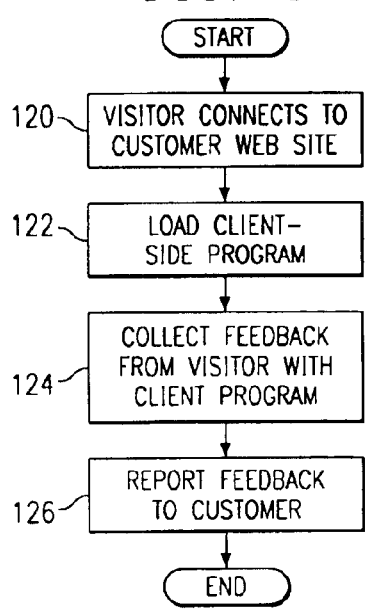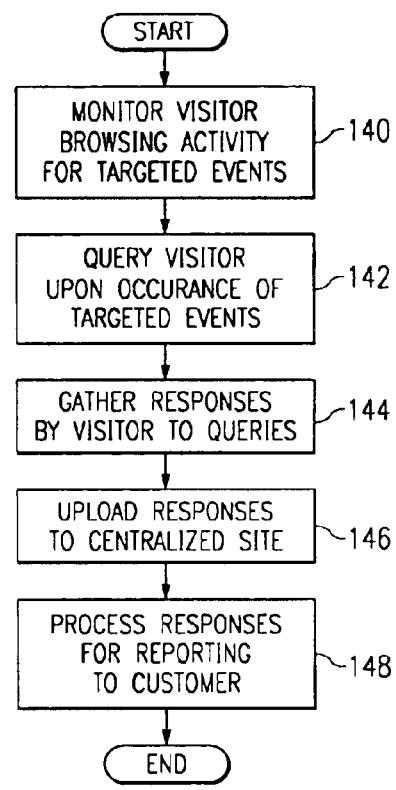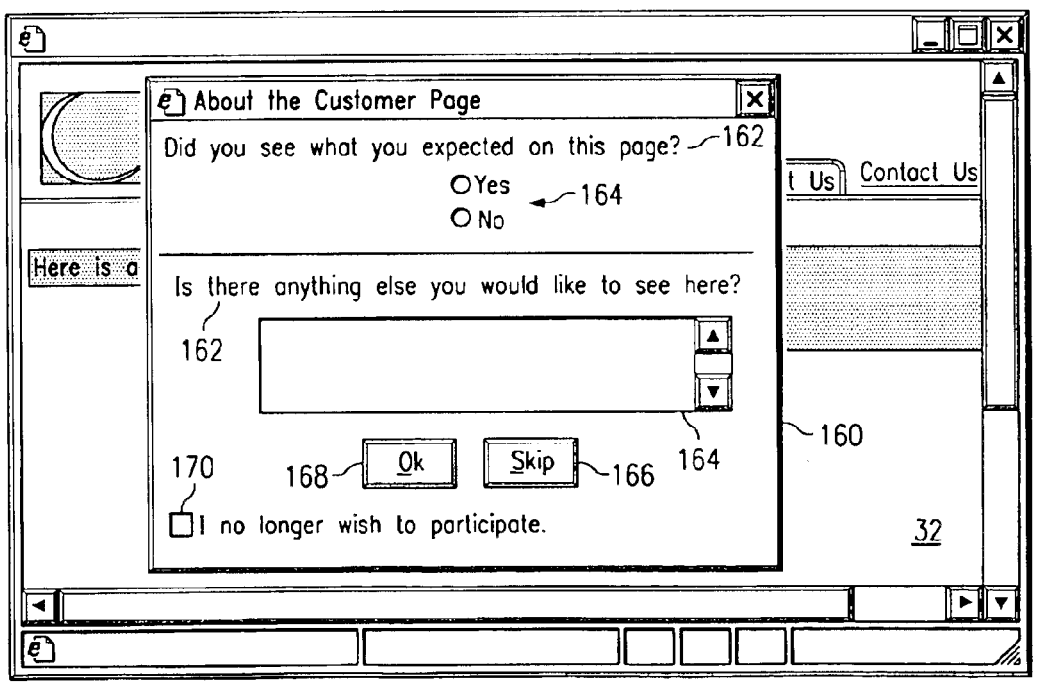

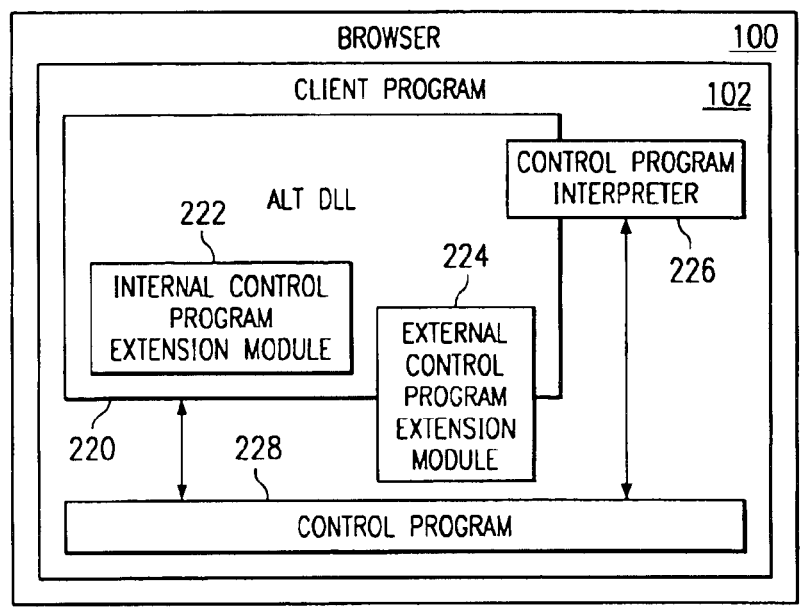

FIG. 7A

```
////////////////////////////////////////////////////////////////
//  Program   :   Example
//
//  Purpose   :   This program is used to interact with web users while on the
//                XYZ Company web site.
//
////////////////////////////////////////////////////////////////
// Import the API function definitions that will be used to provide WebIQ-specific
// functionality
module "..\WebiQ.iem";

////////////////////////////////////////////////////////////////
//  Function  :   IntroduceXYZDemo
//
//  Purpose   :   Inform the web site user that WebIQ is currently running and what
//                they can expect while interacting with the XYZ web site.
//
//  Params    :   None
//
//  Return    :   Nothing
//
////////////////////////////////////////////////////////////////
void IntroduceXYZDemo (void)
{
    int nDialogResult;

////////////////////////////////////////////////////////////////
    // Attempt to create a dialog that will be used to display informational text to
    // the user. If the dialog has already been created, then the function will return 0
    // and we don't need to go through the process of adding the necessary questions.
    ////////////////////////////////////////////////////////////////
    if(CreateDialog("XYZDemoIntroBox","XYZ WebIQ Demonstration",""))
    {

////////////////////////////////////////////////////////////////
        // Create the first statement "question".
        ////////////////////////////////////////////////////////////////
        CreateQuestion (
            "WelcomeStatement",
            "Welcome to the XYZ WebIQ Demonstration.",
```

FROM FIG. 7A

```
    1,
    "Welcome to the XYZ.com WebIQ demo,
    1,
    1
);
////////////////////////////////////////////////////////////////
// Add the newly-created question to the newly-created dialog
////////////////////////////////////////////////////////////////
AddQuestion ("XYZDemoIntroBox", "WelcomeStatement");

////////////////////////////////////////////////////////////////
// Add some vertical space to the dialog so that the questions are separated a bit.
////////////////////////////////////////////////////////////////
AddSpace ("XYZDemoIntroBox",2)'

////////////////////////////////////////////////////////////////
// Create the next statement "question" that'll be used to inform the user what
// WebIQ is doing and what they can expect.
////////////////////////////////////////////////////////////////
CreateQuestion(
    "DemoStatementSeg1",
    "WebIQ is currently running in your browser, although you will not   notice it
    unless>>
    1,
    "explanation that WebIQ is running and transparent to users",
    1,
    1
);

////////////////////////////////////////////////////////////////
// Add the newly-created question to the newly-created dialog.
////////////////////////////////////////////////////////////////
AddQuestion ("XYZDemoIntroBox", "DemoStatementSeg1")'

////////////////////////////////////////////////////////////////
// Create yet another statement "question" that will explain WHY WebIQ will do
// what it will do.
////////////////////////////////////////////////////////////////
CreateQuestion (
```

FROM FIG. 7B

```
        "DemoStatementSeg2",
        "A question box will be triggered when you perform an action that has been
        program>>
        1,
        "explanation that WebIQ is a triggered by pre-programmed events",
        1,
        1
);

////////////////////////////////////////////////////////////////////
// Add the newly-created question to the newly-created dialog.
////////////////////////////////////////////////////////////////////
AddQuestion ("XYZDemoIntroBox","DemoStatementSeg2");

////////////////////////////////////////////////////////////////////
// Display the dialog to the user.
////////////////////////////////////////////////////////////////////
nDialogResult = DisplayDialog ("XYZDemoIntroBox");

////////////////////////////////////////////////////////////////////
// Unregister the event that causes this question to be displayed so that it'll never be
// shown again
////////////////////////////////////////////////////////////////////
UnregisterPageEvent ("XYZDemoStart", "XYZHomepage");
}

////////////////////////////////////////////////////////////////////
// Function   :   AskAboutXYZSite
//
// Purpose    :   Solicit some feedback from the user with regard to the usefulness of
//                the XYZ web site.
//
// Params     :   None
//
// Return     :   Nothing
//
////////////////////////////////////////////////////////////////////
void AskAboutXYZSite (void)
{
    int nDialogResult;
```

FROM FIG. 7C

```
////////////////////////////////////////////////////////////////
// Attempt to create a dialog on which some questions will be placed to get a feel
// for the user's opinion with regard to the usefulness of the web site. If the dialog
// has already been created, then the function will return 0 and we don't need to
// go through the process of adding the necessary questions.
////////////////////////////////////////////////////////////////
if (CreateDialog("XYZSiteExitBox","About the XYZ.com Website",""))

////////////////////////////////////////////////////////////////
// Create a radio button-based question that asks the user if they found the site
// to be helpful.
////////////////////////////////////////////////////////////////
CreateQuestion (
    "SiteFeedbackQues",
    "We are interested in learning whether the information on this site was helpful
    fo>>
    1,
    "did you find what you were looking for on XYZ.com?",
    3,
    2
);

////////////////////////////////////////////////////////////////
// And a "yes" option to the newly-created question (defaults to unselected).
////////////////////////////////////////////////////////////////
AddQuestionOption ("SiteFeedbackQues", 1, "Yes", 0);

////////////////////////////////////////////////////////////////
// Add a "no" option to the newly-created question (defaults to unselected).
////////////////////////////////////////////////////////////////
AddQuestionOption ("SiteFeedbackQues", 1,"No, 0);

////////////////////////////////////////////////////////////////
// Add the newly-created question to the newly-created dialog
////////////////////////////////////////////////////////////////
AddQuestion("XYZSiteExitBox", "SiteFeedbackQues");

////////////////////////////////////////////////////////////////
// Add a line (that is 2 pixels thick) to the dialog to separate the questions on the
// dialog
```

FROM FIG. 7D

```
///////////////////////////////////////////////////////////
AddLine("XYZSiteExitBox", 2);

///////////////////////////////////////////////////////////
// Create a radio button-based question that asks the user to create the quality of
// the site on a scale of 1 to 7.
///////////////////////////////////////////////////////////
CreateQuestion(
    "XYZSatSurvey",
    Please rate the overall quality of this site on a scale of 1 to 7, with 7 being t>>
    1,
    "satisfaction survey for xyz.com, on a scale of 1 (bad) to 7 (good)",
    3,
    2
);

///////////////////////////////////////////////////////////
// Add an option to the question for each of the rating possibilities
///////////////////////////////////////////////////////////
AddQuestionOption ("XYZSatSurvey", 1, "7 Extremely helpful", 0);
AddQuestionOption ("XYZSatSurvey", 1, "6, 0);
AddQuestionOption ("XYZSatSurvey", 1, "5, 0);
AddQuestionOption ("XYZSatSurvey", 1, "4, 0);
AddQuestionOption ("XYZSatSurvey", 1, "3, 0);
AddQuestionOption ("XYZSatSurvey", 1, "2, 0);
AddQuestionOption ("XYZSatSurvey", 1, "1, Not helpful at all", 0);

///////////////////////////////////////////////////////////
// Add the newly-created question to the newly-created dialog
///////////////////////////////////////////////////////////
AddQuestion ("XYZSiteExitBox", "XYZSatSurvey");

///////////////////////////////////////////////////////////
// Add a line (that is 2 pixels thick) to the dialog to separate the questions on the
// dialog
///////////////////////////////////////////////////////////
AddLine (("XYZSiteExitBox", 2);

///////////////////////////////////////////////////////////
// Create a text entry-based question that'll allow the user to provide arbitrary
```

FROM FIG. 7E

```
// feedback with regard to what they would like to see added to the web site.
///////////////////////////////////////////////////////////////
CreateQuestion (
    "XYZSiteSuggestion",
    "Is there anything else you would like to see at XYZ.com?"

1
    "request for suggestions about XYZ.com",
    2,
    2
);

///////////////////////////////////////////////////////////////
// Set the parameters for the text entry box (aprox. 40 characters wide, 3 lines
// high, and a maximum of 200 characters that can be entered)
///////////////////////////////////////////////////////////////
SetQuestionEditParams ("XYZSiteSuggestions", 40, 3, 200);

///////////////////////////////////////////////////////////////
// Add the newly-created question to the dialog
///////////////////////////////////////////////////////////////
AddQuestion (XYZSiteExitBox", "XYZSiteSuggestions")

}

///////////////////////////////////////////////////////////////
// Display the dialog to the user.
///////////////////////////////////////////////////////////////
nDialogResult = DisplayDialog ("XYZSiteExitBox");

///////////////////////////////////////////////////////////////
// Unregister the event that causes this question to be displayed so that it'll never
// be shown again.
///////////////////////////////////////////////////////////////
UnregisteredSiteEvent ("XYZSiteExit", "XYZSite);

}

///////////////////////////////////////////////////////////////
// Function  :  OnInit
```

FROM FIG. 7E

```
//
// Purpose   :  This function is called when the program is initialized by the
//              interpreter
//
// Params    :  None
//
//////////////////////////////////////////////////////////////////
void OnInit (void)

//////////////////////////////////////////////////////////////////
    // Set the default caption or the checkbox that allows the user to prevent future
    // dialogs from popping up. This will apply to all dialogs.
    //////////////////////////////////////////////////////////////////
    SetStopMessage (" ", "I no longer wish to participate.");

//////////////////////////////////////////////////////////////////
    // Create a page attachment to the home page of the XYZ Company web site.
    //////////////////////////////////////////////////////////////////
    CreatePageAttachment ("XYZHomepage", "http://www.im.xyz.com/American*");

//////////////////////////////////////////////////////////////////
    // For the page attachment for the home page of the XYZ Company web site,
    // add a specific value in order for all events associated with the page attachment
    // to be valid.
    //////////////////////////////////////////////////////////////////
    AddPageRequirement ("XYZHomepage", "TITLE", "Home Page with Login", 0);

//////////////////////////////////////////////////////////////////
    // Register on OnLoad event for the home page. This will cause the Onsignal( )
    // function to be called when the page has loaded.
    //////////////////////////////////////////////////////////////////
    RegisterPageEvent ("XYZDemoStart", "XYZHomepage", "OnLoad");

//////////////////////////////////////////////////////////////////
    // Create a page attachment to just about any page within the XYZ Company
    // web site.
    //////////////////////////////////////////////////////////////////
    CreatePageAttachment ("XYZSite", "http://www/im/xyz/com/xyz*");
```

FROM FIG. 7G

```
/////////////////////////////////////////////////////////////////
// Register on OnExit event for the site. This will cause the OnSignal () function
// to be called when the XYZ Company site (as defined by the XYZSite page
// attachment) has been navigated away from.
/////////////////////////////////////////////////////////////////
RegisterSiteEvent (XYZSiteExit", "XYZSite", "OnExit");

/////////////////////////////////////////////////////////////////
// Redirect the web browser to the XYZ Company web site.
/////////////////////////////////////////////////////////////////
Redirect ("http://www.xyz.com/");

}

/////////////////////////////////////////////////////////////////
// Function    :   OnSignal
//
// Purpose     :   This function is called when a registered event is triggered
//
// Params      :   sEventID (string)
//                     The ID of the event that has been triggered (click, page, or site
//                     event)
//
//
//                 sEventParams (string)
//                     Additional information associated with the event. Currently,
//                     this parameter does not contain any kind of useful information;
//                     it will always be an empty string ("") until further implemented
//                     in future releases.
//
// Return      :   Nothing
/////////////////////////////////////////////////////////////////
void OnSignal
(
    string sEventID,
    string sEventParams
)
(
    /////////////////////////////////////////////////////////////////
```

TO FIG. 7I

FIG. 7I        FROM FIG. 7H

```
// The following logic is pretty self-explanatory
//////////////////////////////////////////////////////////////
if(sEventID=="XYZDemoStart")
{
    IntroduceXYZDemo ( );
}
else if (sEventID=="XYZSiteExit")
{
    AskAboutXYZSite ( );

//////////////////////////////////////////////////////////////
// When the user leaves the XYZ Company web site, we want to terminate WebIQ
//////////////////////////////////////////////////////////////
Quit ( );
}
```

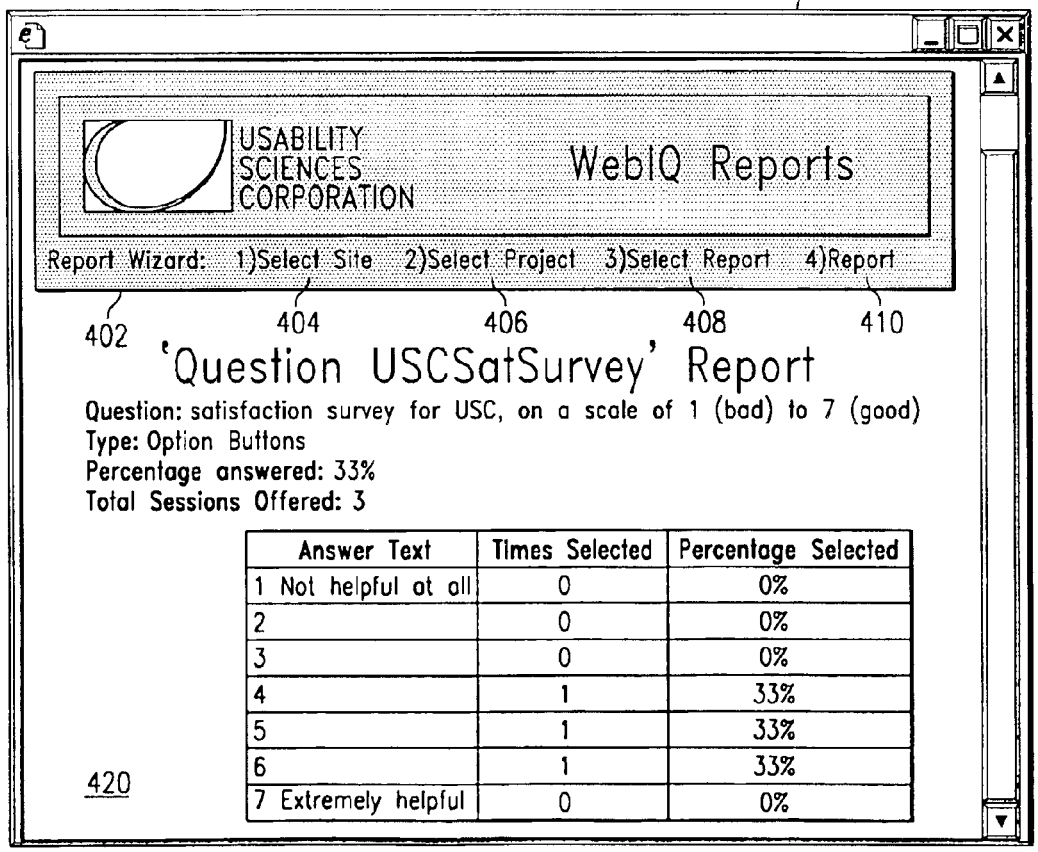

FIG. 10

Questions Table 264

| Index | QuestionID | ProjectIndex | ReportText | Type |
|---|---|---|---|---|
| 1 | QRateSite | 1 | Please rate the [section] section between 1 (bad) and 7 (good) | 3 |
| 2 | QWhatElse | 1 | What other features would you like to see on our site? | 2 |

FIG. 9B

DialogData Table 272

| Index | SessionID | DialogID | DialogName | TimeStamp | DialogResult |
|---|---|---|---|---|---|
| 1 | 1 | SectionReviewDialog | Rate This Section | 08/30/2000 11:01:25 AM | 1 |

FIG. 9C

QuestionInstance Table 273

| Index | DialogIndex | QuestionIndex | SequenceValue | QuestionDisplayText |
|---|---|---|---|---|
| 1 | 1 | 2 | 1 | What other features would you like to see on our site? |
| 2 | 1 | 1 | 2 | Please rate the Services section between 1 (Bad) and 7 (Good). |

FIG. 9D

TextAnswers Table 274

| Index | QinstanceIndex | QuestionIndex | UserText | SequenceValue |
|---|---|---|---|---|
| 1 | 1 | 2 | I would like a search feature on your site. | 1 |

FIG. 9E

OptionAnswers Table 276

| Index | QinstanceIndex | QuestionIndex | AnswerDisplayText | Value | Sequence Value |
|---|---|---|---|---|---|
| 1 | 2 | 1 | 1 (Bad) | 0 | 7 |
| 2 | 2 | 1 | 2 | 0 | 6 |
| 3 | 2 | 1 | 3 | 0 | 5 |
| 4 | 2 | 1 | 4 | 0 | 4 |
| 5 | 2 | 1 | 5 | 1 | 3 |
| 6 | 2 | 1 | 6 | 0 | 2 |
| 7 | 2 | 1 | 7 (Good) | 0 | 1 |

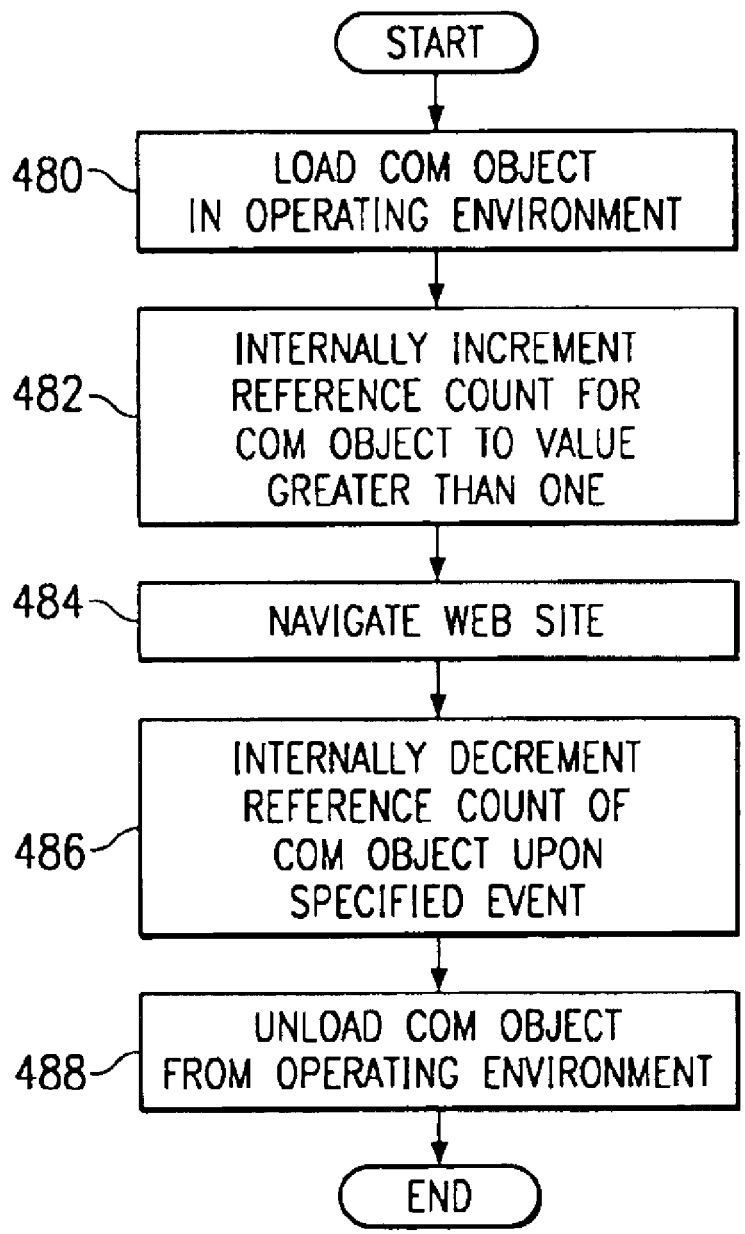

SYSTEM FOR MONITORING BROWSING ACTIVITY OF A VISITOR AND DECREMENTING A REFERENCE COUNT UPON A WEB PAGE CHANGE FOR AUTOMATIC UNLOADING A CLIENT PROGRAM

TECHNICAL FIELD OF THE INVENTION

This invention relates generally to the field of network applications and services, and more particularly, to a client-side application and method for monitoring activities of a visitor to a network site.

BACKGROUND OF THE INVENTION

The Internet is a collection of disparate computer systems which use a common protocol to communicate with each other. A common use of the Internet is to access World Wide Web (web) pages. Web pages are typically stored on a server and remotely accessed by a client over the Internet using a web browser.

A web site is a collection of web pages. A web site includes typically a home page and a hierarchical order of follow on web pages that are accessible through the home page. The web pages are connected to each other using hypertext links. The links allow a user to browse web pages of a web site by selecting the links between the web pages. Distinct Web sites may be respectively identified by respective distinct associated Internet domain names.

To increase user visitations and revenue, web sites have become very sophisticated. Web sites typically include web pages that provide information to users, advertise products or services to users and/or provide site search functions for users. A problem for web site owners is to determine how successful the web site is, for example, whether the informational or other needs of users are met and whether the users are purchasing advertised goods and services.

Traditional marketing studies directed toward target market demographics are of limited effectiveness in gauging user satisfaction with web sites. Online methods of gathering information from visitors regarding web site satisfaction are intrusive and have not been well received. Moreover, such systems typically require extensive reprogramming of a web site, which is time consuming and costly.

Another problem is the limited ability to collect information from one Web page to another, across a Web site. Plug-ins and other programs requiring insulation are too intrusive while ActiveX and other controls that are based on COM objects are automatically unloaded from the operating environment when the visitor changes Web pages.

SUMMARY OF THE INVENTION

The present invention provides an improved client-side application and method for monitoring activities of a visitor to a Web or other network site. In particular, the present invention provides a non-intrusive control that is persistent in an operating environment during browsing across a Web site to allow complete monitoring of site browsing activities from the client-side.

In accordance with one embodiment of the present invention, a method and system for monitoring activity of a visitor to a Web site includes loading a client program into an operating environment of a client machine of the visitor. A reference count associated with the client program is incremented to maintain persistence of the client program in the operating environment during browsing by the visitor across a plurality of Web pages of the Web site. Browsing activity of the visitor is monitored across Web pages with the client program. An indication of the browsing activity of the visitor is uploaded over the network for processing.

More specifically, in accordance with a particular embodiment of the present invention, the client program comprises a component object model (COM) or other self-decrementing object. In this embodiment, the reference count is a reference count of the COM object. The reference count is incremented to a value greater than one for persistence in the operating environment and decremented to a reference count of zero upon a specified event for automatic unloading of the program from the operating environment. The client program may include an ActiveX or other suitable control.

Technical advantages of the present invention include providing an improved client-side application for monitoring activities of a visitor to a Web or other network site. In a particular embodiment, a non-intrusive control that is persistent during browsing across a Web site and/or Web sites is downloaded to the client-side and used to monitor client browsing activity. The persistent control is operable to gather intelligent and comprehensive information on the usability and/or marketability of a complete network site or set of sites.

Another technical advantage of one or more embodiments of the present invention includes providing a persistent component object model (COM) or other self-decrementing object. In particular, the internal reference count of the COM object is artificially incremented to control unloading of the object from the operating environment. As a result, ActiveX and other Internet-enabled COM components are persistent and can be used for inter-page monitoring applications.

Other technical advantages of the present invention will be readily apparent to one skilled in the art from the following figures, descriptions, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which:

FIG. 2 is a flow diagram illustrating a method for gathering feedback from visitors to a Web site in accordance with one embodiment of the present invention;

FIG. 3 is a flow diagram illustrating a method for collecting the feedback of FIG. 2 at the client-side in accordance with one embodiment of the present invention;

FIGS. 4A–B are screen diagrams illustrating the queries of FIG. 3 in accordance with several embodiments of the present invention;

FIG. 5 is a block diagram illustrating details of the client program of FIG. 1 loaded on the client in accordance with one embodiment of the present invention;

FIG. 6 is a table diagram illustrating details of the query state machine of FIG. 5 in accordance with one embodiment of the present invention;

FIGS. 7A–I are a code diagram illustrating an exemplary query state machine of FIG. 5 in accordance with one embodiment of the present invention;

FIG. 8 is a diagram illustrating details of a session record of FIG. 1 in accordance with one embodiment of the present invention;

FIGS. 9A–E are table diagrams illustrating details of exemplary tables of FIG. 8 in accordance with one embodiment of the present invention;

FIG. 10 is a screen diagram illustrating functionality of the reporting server of FIG. 1 in accordance with one embodiment of the present invention;

FIG. 12 is a flow diagram illustrating a method for controlling the persistence of a component object model (COM) object in a client operating environment in accordance with one embodiment of the present invention.

DETAILED DESCRIPTION OF THE INVENTION

Figure 1:
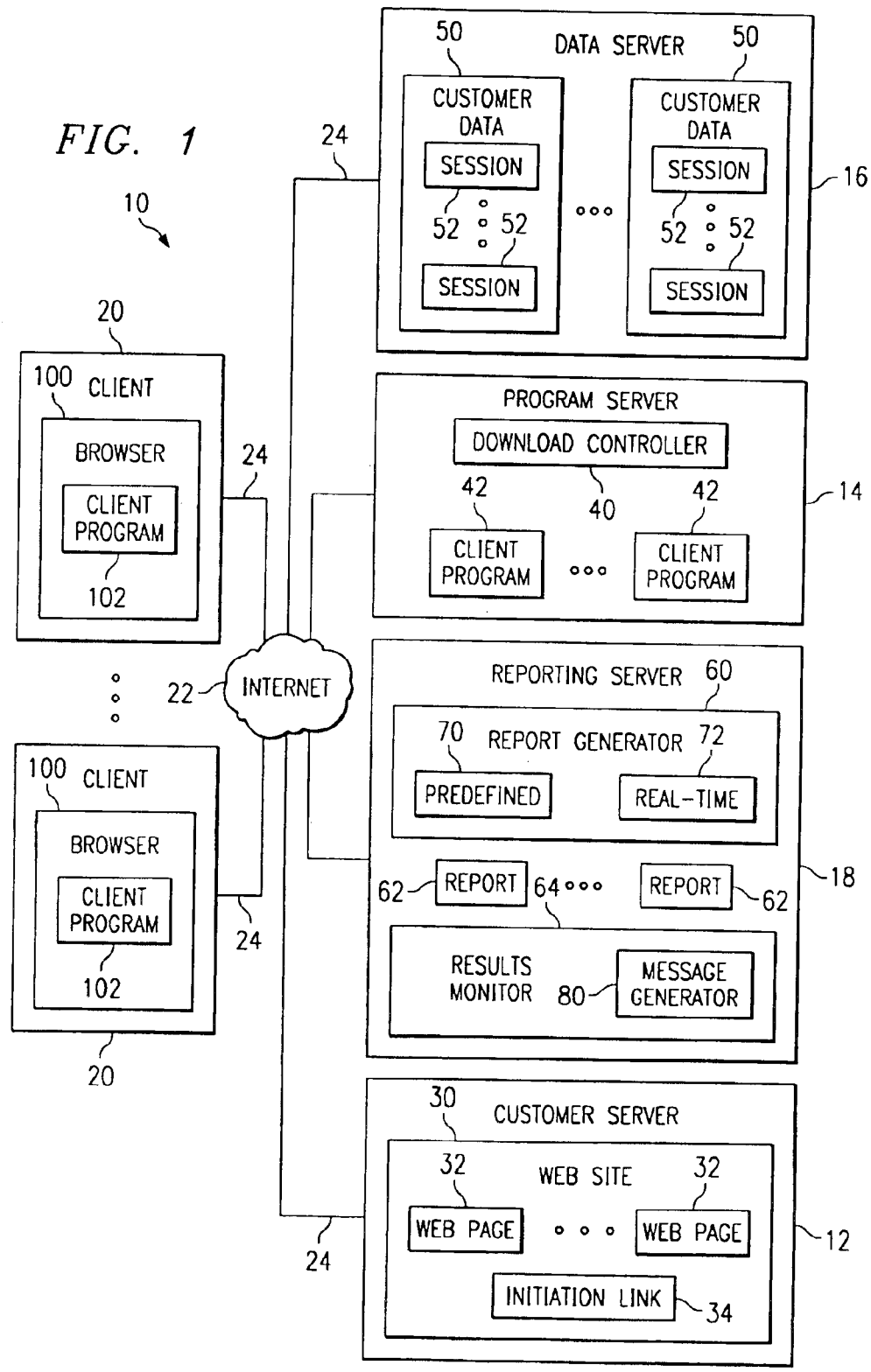
FIG. 1 is a block diagram illustrating a system for gathering feedback from visitors to a Web site in accordance with one embodiment of the present invention.

FIG. 1 illustrates a network based system 10 for gathering feedback from visitors to a network site in accordance with one embodiment of the present invention. In this embodiment, the network site is a World Wide Web (Web) site including a plurality of Web pages. The Web site is accessed by visitors over the Internet. It will be understood that the network site may be any other suitable type of site providing remotely accessed information and/or services. The network may be any other suitable type of network, such as local area network (LAN), wide area network (WAN), intranet, extranet or combinations of networks.

Referring to FIG. 1, the system 10 includes a customer server 12, a program server 14, a data server 16, and a reporting server 18 connected to a plurality of clients 20 over the Internet 22 and links 24. The servers 12, 14, 16, and 18 communicate with each other and with the client 20 using the Transmission Control Protocol/Internet Protocol (TCP/IP) or other suitable protocols. The links 24 are cable, optical, radio frequency and/or other suitable wireline and/or wireless links.

The servers 12, 14, 16, and 18 and the client 20 comprise hardware and/or software operable to perform the functionality of the system 10. The hardware comprises a general purpose processor and/or application specific integrated circuits (ASIC), field programmable gate arrays (FPGA) and/or other logic encoded hardware. The software comprises instructions or other logic encoded in any suitable medium, such as diskette, compact disk (CD), hard drive or other memory media.

The customer server 12 includes a customer Web site 30 having a plurality of Web pages 32. The Web pages 32 provide information to site visitors, advertisements of goods and services available from the Web site 30, search functionality for finding information in the Web site 30 and other suitable information and functions. The Web pages 32 include a home, or main page, and a follow on pages 32 connected to each other in the Web site 30 by hyperlinks.

An initiation link 34 is included on the home or other suitable Web pages 32 of the site 30. The initiation link 34 temporarily redirects a visitor from the customer server 12 to the program server 14 for download of a client program that is operable to gather feedback from the visitor about the Web site 30. In a particular embodiment, the initiation link 34 uniquely identifies the Web site 30 to facilitate identification of the corresponding client program at the program server 14. The initiation link 34 may also identify one of a number of projects for the Web site 30 based on visitor demographics or other suitable information.

Use of the initiation link 34 allows feedback to be gathered with minimum modification to the Web site 30 because only the initiation link 34 need be added to the site 30. In addition, use of the initiation link 34 allows centralized storage and maintenance of the client programs as well as modification and updating of the client programs with no further modifications to the Web site 30. In an alternate embodiment, the client programs may be stored on the customer server 12 for direct downloading to the client 20.

The program server 14 provides client programs for the clients 20. In one embodiment, the program server 14 includes a download controller 40 and a plurality of client programs 42. The download controller 40 determines the client program 42 to be downloaded to a client machine 20 based on the Web site 30 and/or project for which feedback is to be gathered.

In one embodiment, the client 20 transmits a unique identifier received from the initiation link 34 to the download controller 40 to allow the download controller 40 to determine the corresponding client program 42 to be downloaded to the client 20. It will be understood that the download controller 40 may otherwise suitably determine the client program 42 for download to a client 20 based on information from the client 20 and/or the customer server 12.

The client program 42 is operable to be downloaded to the client 20 and to run on the client 20 to monitor browsing activity of the visitor at the Web site 30, collect feedback from the visitor about the browsing activity, and upload the feedback to the data server 16 for processing. In one embodiment, as described in more detail below, the client program 42 is an ActiveX control. It will be understood that any other suitable type of application and/or control may be used for the client program 42.

The data server 16 receives, processes and stores feedback uploaded by the client program 42 on the client 20. The data server 16 includes one or more customer data bases and/or tables 50 for storing feedback for customers and/or customer projects. Each customer data file 50 includes data from a plurality of related sessions 52. Each session 52 stores feedback from a particular visit by a visitor to a Web site 30.

The reporting server 18 includes a report generator 60, reports 62 and a results monitor 64. The report generator 60 accesses the data server 16 to generate the reports 62. In one embodiment, the report generator 60 includes a predefined report generator 70 for generating reports on a scheduled basis and a real-time report generator 72 for dynamically generating reports based on customer request and criteria. The reports 62 display session data 52, summarize the session data and/or analyze the session data for trends, visitor usage patterns and other information directed toward the usability and/or marketability of the Web site 30.

The results monitor 64 accesses the data server 16 and/or reports 62 to monitor and analyze collected data for developing trends and/or usage patterns. In response to identification of an emerging trend or usage pattern, a message generator 80 generates and transmits a message to the owner of the Web site 30 or other customer identifying the trend or usage pattern. In this way, the customer is able to react in real-time to correct developing problems and keep successful content.

The clients 20 each include a browser 100 and a client program 102 downloaded from the program server 14. As used herein, each means everyone of at least a subset of the identified items. The browser 100 may be Microsoft Internet Explorer, Netscape Communicator or any other suitable application operable to access Web sites 30 over the Internet 22. For the Microsoft Internet Explorer embodiment, the client program 102 may be an ActiveX-control that automatically loads into the operating environment of the client 20 to gather feedback from a Web site visitor and automatically unloads from the operating environment of the client 20 upon disconnection by the visitor from the Web site 30. In this way, intrusion on the client 20 is minimized. It will be understood that other Internet or network technologies may be used in connection with the client program. The operating environment comprises any suitable support environment for supporting use of the element using the environment. For example, the operating environment for browser 100 may comprise an operating system associated with client 12. For another example, the operating environment for program 102 may comprise browser 100 and/or the operating system associated with client 12.

In another embodiment, the client program 102 is a plug-in or other application that is persistent in the browser 100 and/or persistent in the operating environment. In this embodiment, the client program 102 may be installed with the browser 100 or downloaded once for use in connection with multiple Web sites 30. The plug-in or persistent client program 102 may be used in connection with free Internet services where visitor feedback is collected by an Internet Service Provider (ISP) for use or resale to the Web site owners.

In operation, as described in more detail below, the system 10 allows network site owners to perform market and usability research with actual site visitors. The client program 102 intelligently solicits customer feedback through simple pop-up dialogs displayed to visitors during browsing of the Web site. The feedback may be a numerical survey rating, a Yes/No response, a free form comment or any suitable response to a query. The system 10 gathers feedback at the precise time the visitor is experiencing a specific part of the site to add statistical validity to the data and improve the browsing experience. Visitor responses may be accumulated and reported within hours to allow customers to react to developing trends and usability patterns.

FIG. 2 is a flow diagram illustrating a method for gathering feedback from a visitor to a network site in accordance with one embodiment of the present invention. In this embodiment, the network site is a Web site and the network is the Internet 22.

Referring to FIG. 2, the method begins at step 120 in which a visitor connects to a customer Web site 30. Next, at step 122, the client or other suitable client-side program 42 is loaded into the operating environment of the client 20 for the visitor. The client program 42 may be loaded only upon permission from the visitor or in the background without communication with the visitor.

Proceeding to step 124, feedback is collected from the visitor with the client program 42. The feedback may include browsing activities, audio and/or video records of visitor shopping experiences and/or other data providing information on the visitor's interaction with the Web site 30. The feedback may be collected behind the scenes without interaction with the visitor or through queries posed to the visitor. The queries may be tied to the site visitor usage patterns so that data is uniquely targeted according to client requirements.

The queries may be posed in real-time in response to current browsing activities or after the fact in response to previous activities. In a particular embodiment, the queries are posed substantially immediately in response to an activity, without waiting for additional visitor activity, to add statistical validity to the data and improve the customer experience. The queries include one or more questions with free form and/or defined answer types for completion by the visitor. Preferably, the questions are answered with two mouse clicks or less to minimize intrusiveness into the browsing session.

At step 126, the feedback is reported to the customer. In one embodiment, responses to queries are streamed from the client 20 to the data server 16 substantially upon receipt by the client 20. In this embodiment, the data is processed and analyzed by the data server 16 and/or reporting server 18 and provisioned to the customer in real-time or on a periodically scheduled basis.

Step 126 leads to the end of the process by which feedback is gathered from a visitor to a Web site 30 from the client-side in a non-intrusive manner. Using the feedback, sales and marketing teams from the Web site are able to continually gather customer input on product positioning, marketing message and customer satisfaction. In addition, interface designers and usability experts are able to continually improve visitor browsing experiences by obtaining opinions from the visitors about the features and functions of the site.

FIG. 3 is a flow diagram illustrating details of a method for collecting feedback at the client-side in accordance with one embodiment of the present invention. The feedback is collected about browsing activities performed by the user at the Web site 30 associated with targeted browsing activities. The targeted browsing activities comprise monitorable activity and inactivity. The targeted browsing activities may be individually customized based on the Web site 30 being visited by the user. For example, the targeted browsing activity may comprise a plurality of events associated with browser 100. For another example, the targeted browsing activity may comprise the absence of a particular event, such as a lack of a "buy" action on a Web page in response to a "search" action. In general, the targeted browsing activities may comprise any suitable combination of activity or inactivity.

In this embodiment, the visitor to the Web site 30 is queried by the client program 102 in response to targeted events. In this embodiment, the targeted events comprise the targeted browsing activity. The targeted events may be any suitable activity by the visitor and/or the Web site 30 in response to visitor activity. It will be understood that the client program 102 may report, analyze and/or otherwise respond to targeted events in addition to or in place of the queries.

Referring to FIG. 3, the method begins at step 140 in which browsing activity of the visitor is monitored for targeted browsing activities. At step 142, the visitor is queried upon the occurrence of targeted events. The query may be posed by dialog boxes, video, audio or any other suitable means and may be directly or indirectly after the targeted event.

Proceeding to step 144, responses by the visitor to the queries are gathered by the client program 102. At step 146, the responses, in their original or modified form are uploaded to the data server 16 or other centralized site. In another embodiment, the responses may be directly uploaded to the Web site.

At step 148, the responses are processed by the data server 16 and reporting server 18 and reported to the customer. Step 148 leads to the end of the process by which visitors to a Web site 30 are directly queried about the marketability and/or usability of the Web site in a non-obtrusive manner and in real-time during a browsing session.

Figure 4B:
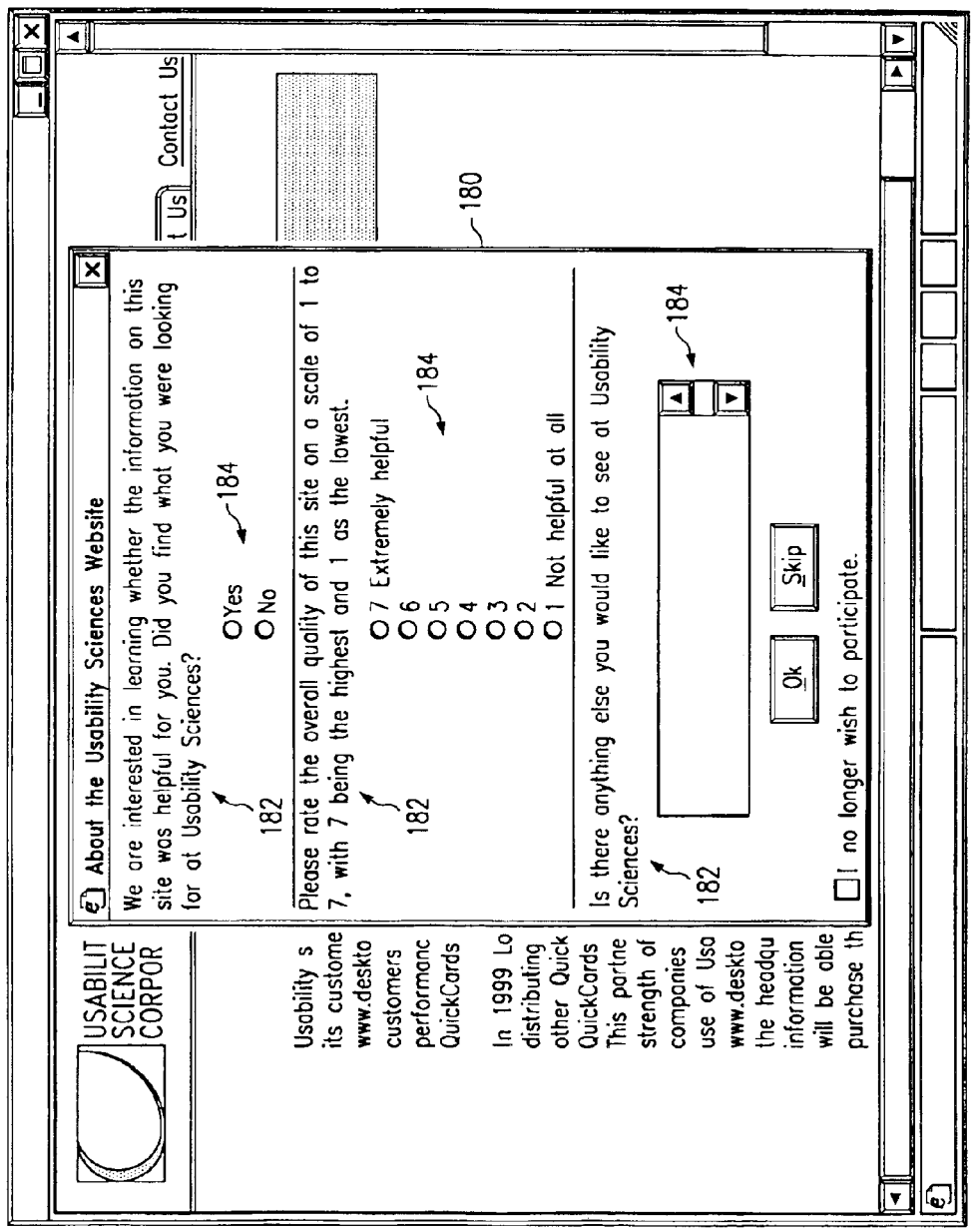

FIGS. 4A–B illustrate exemplary queries in accordance with several embodiments of the present invention. In these embodiments, the queries are posed to the visitor in dialog boxes including questions and answer fields. As previously described, the queries may be otherwise suitably posed to visitors without departing from the scope of the present invention.

Referring to FIG. 4A, a dialog box 160 is displayed to a visitor in response to specified activity at a Web page 32. The dialog box 160 includes a plurality of questions 162 and corresponding answer fields 164. In the exemplary query, the answer fields 164 include specified radio buttons and free form answer fields. The dialog box 160 also includes a skip selection 168 to skip the query and a terminate selection 170 to opt out of the feedback process. Accordingly, the visitor remains in control and is more likely to initially participate in the feedback process and to provide worthwhile answers during the process.

Referring to FIG. 4B, a dialog box 180 is displayed to a visitor in response to an end of the session. The dialog box 180 includes a plurality of questions 182 and corresponding answer fields 184 directed toward the general usability of the Web site 30. As with dialog box 160, the visitor is allowed to skip the query and to end participation in the feedback process.

FIG. 5 is a block diagram illustrating details of client program 102 used with browser 100. Monitoring program 102 comprises a support module 220, an internal extension module 222, an external extension module 224, an interpreter 226 and a control program 228.

Support module 220 comprises any suitable combination of hardware and software operable to support use of monitoring program 102 with browser 100. In the disclosed embodiment, support module 220 comprises a library of standard ActiveX controls used by extension modules 222 and 224 and Component Object Model (COM) objects used to support modules 222 and 224. The Component Object Model is a standard architecture for distributed objects provided by Microsoft Corporation of Redmond, Wash. Alternatively, support module 220 may comprise a Java applet, an external plug-in and other suitable software.

Internal extension module 222 comprises extensions to support module 220 for supporting execution of control program 228. In the disclosed embodiment, internal extension module 222 comprises a library of ActiveX functions operable to provide support for the capabilities of control program 228 and allow control program 228 to control and interact with browser 100. Alternatively, internal extension module 222 may comprise Java classes, COM objects or other suitable software for supporting control program 228.

External extension module 224 comprises custom extensions to support module 220 for supporting execution of control program 228. More specifically, while internal extension module 222 provides standard support functionality to control program 228, external extension module 224 provides support for particular customizations. For example, browser 100 executing on a UNIX machine may require specialized functionality not needed by other operating systems. In the disclosed embodiment, external extension module 224 comprises a library of ActiveX functions operable to provide support for the capabilities of control program 228 and allow control program 228 to control and interact with browser 100. Alternatively, external extension module 224 may comprise Java classes, COM objects, or other suitable software for supporting control program 228.

Interpreter 226 comprises any suitable combination of hardware and/or software operable to interpret and execute instructions in control program 228 using support module 220 and extension modules 222 and 224. In the disclosed embodiment, interpreter 226 comprises an interpreter for the language associated with control program 228. For example, interpreter 226 may comprise a Java Virtual Machine or other suitable software for interpreting, compiling and/or executing control program 228, or an Extensible, General Use Language (EGUL) scripting language interpreter.

Control program 228 comprises a program, operable to handle events generated by browser 100 and perform actions based on the browser events. In the disclosed embodiment, control program 228 comprises a state machine for performing actions based on browser events and is described in more detail in association with FIG. 6. For example, control program 228 may comprise an EGUL script, a Java applet, an external plug-in and may utilize any suitable technique for receiving and handling browser events.

In operation, client program 102 may be installed on a user's computer using web browser 100. Stated another way, client program 102 may not be capable of executing independently of web browser 100. Alternatively, client program 102 may be a stand-alone program operable to interact with web browser 100. Browser 100 generates a browser event. The browser event comprises an indication of an action taken by a user of browser 100. For example, a browser event may be generated when a user clicks the mouse button, passes the mouse pointer over a graphic image, or selects a hypertext link. Support module 220 receives the browser event and passes the browser event to control program 228. Control program 228 then determines whether browser event is a targeted event or trigger, and how the browser event is to be handled. For example, program 228 may determine that based on the current Web page the user is viewing that the user should be presented a particular question. Also, program 228 may take no action in response to the browser event.

Control program 228 is further operable to filter browser events for targeted browsing activities. In response to detecting the targeted browsing activity.

Control program 228 is interpreted by interpreter 226 and utilizes modules 222 and 224 to control and interact with browser 100. For example, in response to a browser event, control program 228 may determine that a new dialogue box with a question should be displayed to the user. Extension modules 222 and 224 may then interact with support module 220 to, for example, instruct browser 100 to generate a new window and display the question in the newly generated window.

As control program 228 is operable to receive browser events, program 228 may be configured to handle and respond to many actions taken by the user using browser 100. Typically, browser 100 utilizes the browser events to denote activity occurring with browser 100. control program 228 can intercept these events. control program 228 may use the capability to receive events generated by browser 100 to provide fine-grained tracking of user activities on a Web site. In contrast to existing systems, program 228 does not have to wait for a user to select a link or otherwise communicate with a server to present a question or gather information. Instead, control program 228 may present questions or otherwise track user activity and/or inactivity independent of browser communication with a remote server. For example, control program 228 may respond to the location of the mouse pointer on the Web page, how long a user views a particular portion of the Web portion of the Web page, and other client-side activities which are typically not communicated to a remote server but handled by browser 100 itself.

FIG. 6 is a table 240 illustrating an exemplary implementation of control program 228. Table 240 comprises a state 242, a targeted event 244, criteria 246, an action 248, and a next state 250. State 242 comprises an indication of a state that control program 228 may be in and associated with action 248. More specifically, when program 228 receives targeted event 244, program 228 may examine table 240 for actions 248 is to be taken when program 228 is in a given state 242. In the disclosed embodiment, state 242 is indicated by an integer value. Alternatively, state 242 may be indicated by any suitable indication of the current state, such as an alphanumeric indication. The current state may be maintained by program 228.

Targeted event 244 comprises a browser event received from browser 100 that may be handled by control program 228. For example, targeted event 244 may comprise an indication of a mouse click, or that the mouse pointer has been moved over a particular part of a Web pages being displayed by browser 100.

Criteria 246 comprises an indication of when action 248 should be performed when a particular targeted event 244 is received while in a given state 242. For example, criteria 246 may comprise an indication of one or more Web pages, such as a Web pages indicated by uniform resource locator (URL). For another example, criteria 246 may specify multiple elements, such as a particular Web pages and a location on that Web pages.

Action 248 comprises an action to be taken by browser 100 and/or modules 220, 222, and/or 224. For example, action 248 may be presenting a question to the user. Next state 250 comprises an indication of the next state program 228 is to enter after completing action 248.

For example, the first entry in FIG. 6 illustrates that when the current state 242 of program 228 is one and a targeted event 244 of a mouse click is received by control program 228, control program 228 will determine whether criteria 246 is met. In the first entry of table 240, criteria 246 restricts action 248 in state one occurring when browser 100 is displaying a Web pages within the domain "xyz.com". The indicated action 248 is that a question should be presented to the user. Next state 250 indicates that after action 248 has been completed that program 228 should enter state two. For another example, the second entry in table 240 indicates that when program 228 is in state 242 of one, a "mouse over" targeted event 244 is received, browser 100 is displaying a Web pages within domain "xyz.com", and the mouse over event 244 occurs at a particular location on the Web pages, then action 248 should be taken.

Wild cards may be used in any of state 242, targeted event 244 and criteria 246. For example, the third entry in table 240 illustrates a wild card used for targeted event 244 and criteria 246. These wild cards indicate that when program 228 is in state 242 of two, action 248 should be taken in response to any targeted event 244 without restriction from criteria 246. For another example, the fourth entry in table 240 indicates that when in state 242 of three, a targeted event 244 of a mouse click should trigger action 248 with no restrictions in criteria 246. For yet another example, the wild cards utilized in association with the domain "xyz.com" in the first and second entries of table 240 may be used to indicate any Web pages under that domain. A wild card in state 242 may be used to indicate that an action 248 is to be taken regardless of the current state of program 228 in response to a particular targeted event 244. In general, wild cards may be used in any suitable manner with respect to state 242, targeted event 244 and/or criteria 246.

FIGS. 7A–I illustrate an exemplary implementation of control program 228. The exemplary implementation of FIGS. 7A–I illustrate one method for generating and presenting questions to a user of browser 100.

Figures 8, 9A:
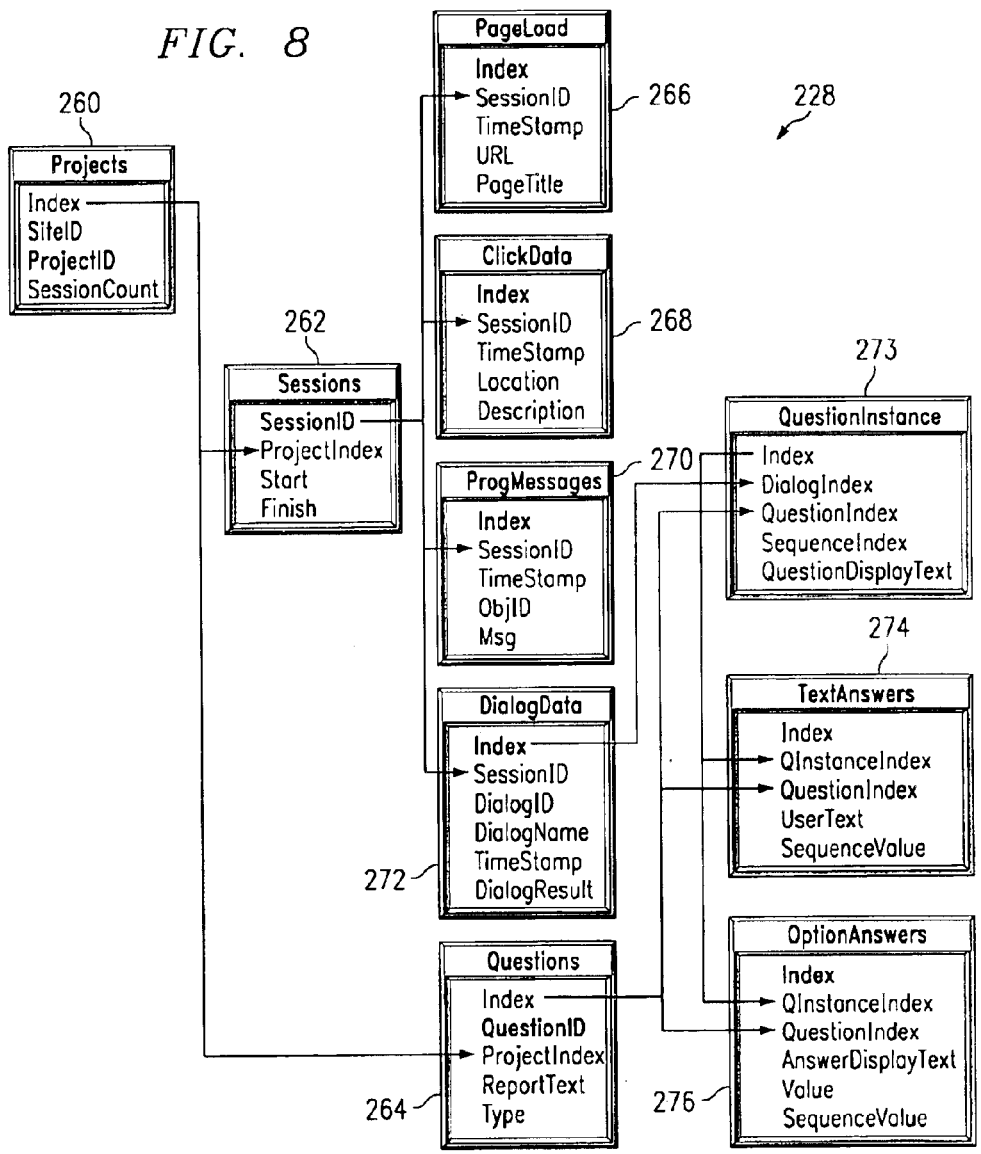

FIG. 8 is a block diagram illustrating an exemplary organization of program 228. Program 228 may associate one or more projects 260 with a Web page. Each project 260 comprises a collection of questions, answers, and triggers, such as targeted events 244 in FIG. 6, associated with a Web site. Project 260 comprises one or more sessions 262 and question data 264. Each session 262 comprises data associated with individual users of a Web site. For example, session 262 may utilize a "cookie" to track historical and other data associated with a user of browser 100. Alternatively, session 262 may track data about users in a transient form. For example, session 262 may track data associated with the user only while the user is using a particular Web site and discard that data after the user departs. In general, session 262 may be used to track data associated with individual users using any suitable technique.

Session 262 comprises page load data 266, click data 268, program messages 270 and dialogue data 272. Page load data 266 comprises data indicating which pages the user has selected. Click data 268 comprises data indicating Web page elements, such as buttons and graphics, and locations on the Web page where the user has clicked. Program messages 270 comprise program generated statistics to gather without user interaction For example, program 228 may collect data associated with click-through actions, page loads, site specific events, timing data related to user actions, on-screen pointer movement information, customized data, and other suitable data.

Dialogue data 272 comprises text, graphics and other information to be presented to the user in association with question data 264 and question instance data 273. Question data 264 comprises text, graphics and other data used to generate questions to present to the user using control program 228. For example, question data 264 may comprise a list of questions to the user. Question data 264 may utilize data stored in dialogue data 272 and question instance data 273.

Question index data 273 comprises the particular questions associated with program 228. Question index data 273 ties together text answers 274 and option answers 276 into sets of questions and associated answers. Text answers 274 comprise text, graphics and other data to be used in association with questions in question data 264 to generate questions having free-form answers. For example, a question in question data 264 asking "What other features would you like to see on our site?" may use data in text answers 274 to generate the question. Text answers 274 may also indicate how to utilize and/or value the answer received from the user. Options answers 276 comprise text, graphics and other data to be used in association with questions in question data 264 to generate questions having fixed-form answers. For example, a question in question data 264 asking "Please rate this section of the Web site from 1 to 7", may use option answers 276 to present a list of radio buttons and associated text for the user to select. Option answers 276 may also indicate how to utilize and/or value the answer received from the user.

FIG. 9A is a table illustrating an exemplary embodiment of question data 264. FIG. 9B is a table illustrating an exemplary embodiment of dialogue data 272. FIG. 9C is a table illustrating an exemplary embodiment of question instance data 273. FIG. 9D is a table illustrating an exemplary embodiment of text answers 274. FIG. 9E is a table illustrating an exemplary embodiment of option answers 276.

FIG. 10 illustrates a graphical user interface (GUI) for the reporting server 18 in accordance with one embodiment of the present invention. In this embodiment, reports 62 are generated and stored on the customer server 18 and remotely accessed by the customer over the Internet 22 from a client 20 or other suitable computer. Customer access is limited to data and reports 62 for only its Web site 30 using security techniques, such as a customer name and password or other suitable security measures. In another embodiment, reports 62 may be electronically or otherwise transmitted to the customer for local access by the customer.

Referring to FIG. 10, the GUI 400 includes a toolbar 402 including a select site button 404, a select project button 406, a select report button 408, and a report button 410. The select site button 404 allows a customer to select between one or more sites 30 for which feedback is being gathered by the system 10. The select project button 406 allows the customer to select between one or more projects 260 for a selected site 30. Thus, plurality of projects 260 can be simultaneously run for a Web site 30. The select report button 408 allows the customer to select between one of a number of pre-defined reports. The report button 410 allows the customer to dynamically create reports and/or to customize reporting criteria.

A results window 420 of GUI 400 selections, data and reports selected by the customer in the toolbar 402. In the illustrated embodiment, the report 62 provides a description of the question, answer type, a percentage of questions answered by visitors, a total number of sessions in which the particular question was offered and the answers. In this way, the customer and can gauge the marketability and usability of the Web site 30 and of the feedback process. The reports 62 may display any other suitable type or indication of feedback collected by the system 10 and/or summaries and analysis of the data.

Figure 11:
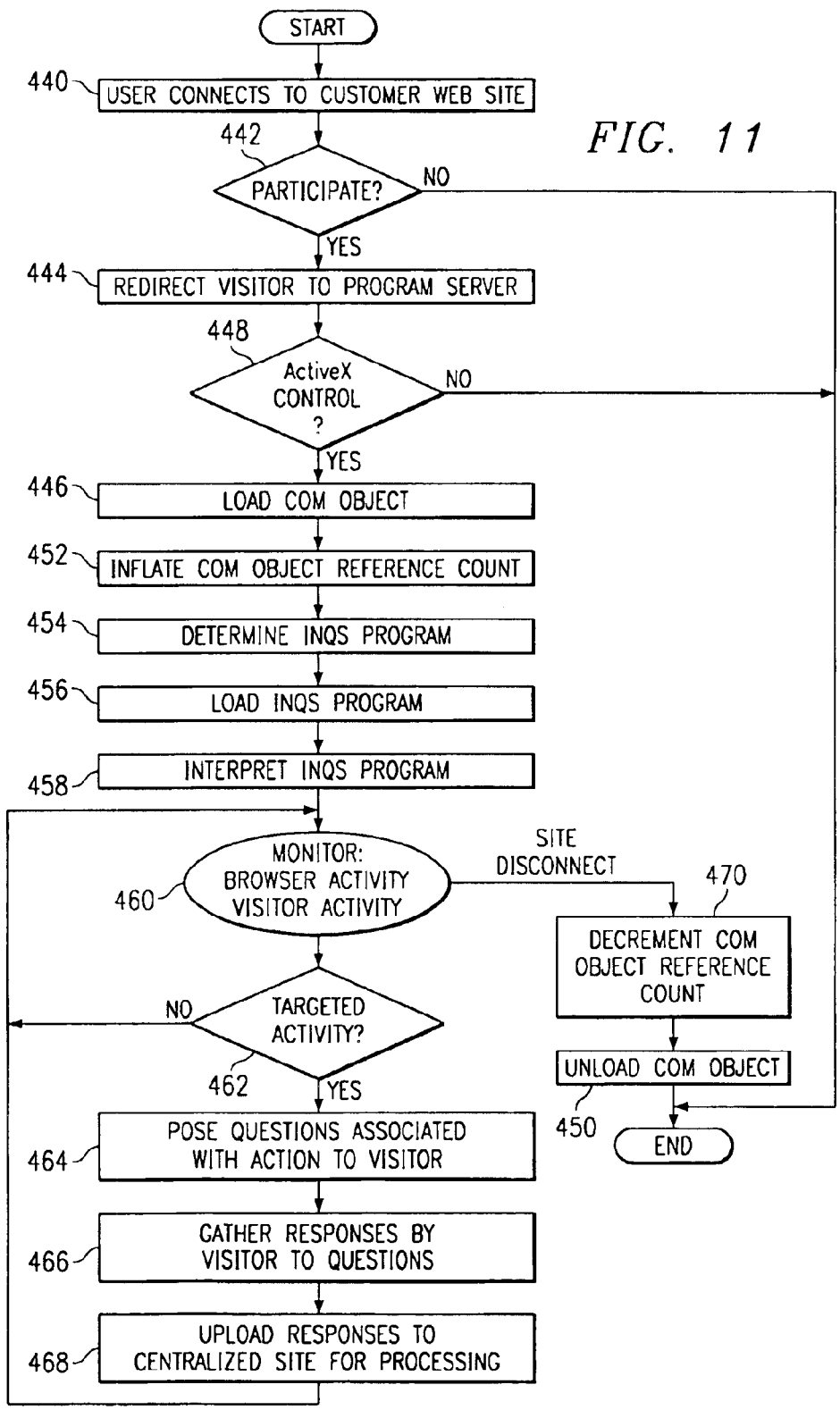
FIG. 11 is a flow diagram illustrating a method for gathering feedback from a visitor to a Web site using the client program of FIG. 5 in accordance with a particular embodiment of the present invention.

FIG. 11 is a flow diagram illustrating a method for gathering feedback from a visitor to Web site 30 in accordance with a particular embodiment of the present invention. In this embodiment, feedback is gathered from the visitor using the COM objects and the ActiveX controls of FIG. 5. As described in more detail below, the COM object automatically loads into the operating environment, is maintained in the operating environment, loads the ActiveX control and is unloaded from the operating environment to minimize intrusiveness on the client 20.

Referring to FIG. 11, the method begins at step 440 in which the user connects to the customer Web site 30. At step 442, customer is asked to participate in the feedback process by the initiation link 34 which is activated by the connection. If the visitor declines to participate, the No branch of step 442 leads to the end of the process. Accordingly, feedback is not obtained without permission of the visitor. If the visitor selects to participate, the Yes branch of step 442 leads to step 444.

At step 444, the browser 100 of the client 20 is redirected to the program server 14 by the initiation link 34. Proceeding to decisional step 448, the user is asked to accept the download of an ActiveX control for the with feedback process. If a user declines to accept the ActiveX control, the No branch of decisional step 448 is followed and the process ends. If the visitor agrees to accept the ActiveX control, the Yes branch of decisional step 448 leads to step 446.

At step 446, a COM object is downloaded from the program server 14 to the client 20. The COM object uses IP and PORT properties which may be identified in the HTML and/or HTTP request associated with the initiation link 34 to establish a TCP/IP connection with the program server 14. Then, at step 452, the reference count of the COM object is artificially inflated to maintain persistence in the operating environment of the client 20 during browsing by the visitor across the customer Web site 30. More specifically, the reference count associated with the COM object is incremented by one by the operating environment each time the COM object is instantiated. The reference count associated with the COM object is also artificially incremented by program 228. By artificially incrementing the reference count independent of an instance of the COM object being created, the reference count then equals the number of instantiations of the COM object plus one. As the COM system typically does not unload a COM object until the reference count associated with that COM object is zero, the persistence of the COM object may be controlled independently of the number of instantiations of the COM object. At step 454, the program server 14 determines the query state machine, or control program 228 for the client 20. In a particular embodiment, the COM object sends a TCP/IP packet that contains a select program command that defines the Web site ID of the site 30 the visitor is visiting. The command may also specify a project ID if the COM object is configured by the Web site 30 to use a specific control program 228. The download controller 40 of the program server 14 looks up a Web site ID in a database of client programs 42. If the COM object provided a project ID to the download controller 40, the program server retrieves that project's control program 228 from the database. Otherwise, the download controller 40 decides which control program 228 to deliver based on rules associated with the given Web site ID and the database.

Next, at step 456, the control program 228 is loaded on the client 20. In one embodiment, the control program 228 is loaded by the download controller 40 sending the COM object a TCP/IP packet that contains a selected control program 228. In particular, information returned includes a project ID having a unique identifier of the project being executed, a server IP including an IP address of the data server 16 that will record data uploaded by the control program 228, a server port on which the data server 16 is listening, a code size including the total size of the control program 228 being returned and code which includes actual control program 228 to run as a binary stream. Once the COM object receives the control program 228, it disconnects from the program server 14. The control program 228 is then loaded into the operating environment of the client 20.

At step 458, the control program 228 is interpreted and runs on the client machine 20. Step 458 leads to state 460 in which browser activity of the visitor is monitored by the control program 228. In response to browsing activity, state 460 transitions to decisional step 462. The activity may comprise pointer movement, pointer location, user input, lack of user input when expected or other actions or suitable inactions. A pointer comprises an on-screen location indicator responsive to a user input device such as a mouse, trackball, joystick, light pen or other suitable input device.

At decisional step 460, the control program 228 determines whether the activity is a targeted activity. If the activity is not targeted, the No branch of decisional step 462 returns to state 460. If the activity is targeted, the Yes branch of decisional step 462 leads to step 464. At step 464, questions associated with the activity are posed to the visitor. As previously described, the questions may be posed by a dialog box or other suitable means. At step 466, responses by the visitor to questions are received and gathered by the control program 228.

Proceeding to step 468, the responses are uploaded to the data server 16 for processing and/or reporting. In one embodiment, the COM object connects to the data server 16 using the IP address and port number provided by the program server 14. In this embodiment, the COM object sends a TCP/IP packet to the data server which contains a bind command. This command identifies which Web site 30 through the Web site ID and which program through the program ID is being used for the session. The COM object streams the data as a visitor answers individual questions.

In a particular embodiment, the dialog uploaded to the data server 16 includes a dialog name with a null termination string, a time stamp with a date, a year, a month, an hour, a minute and a second as well as text entry length, text entries, radio entry length, radio entries, check entry length and check entries. In this embodiment the lengths are integers while the entries are byte streams. As dialog data is received, the data server 16 adds to the collective data in the database. Step 468 returns to state 460 where monitoring of browsing activity continues during the visitor browsing session.

In response to a site disconnect, monitoring state 460 transitions to step 470. At step 470, the reference count of the COM object that was artificially incremented at step 452 for persistence is decremented to allow automatic unloading of the COM object at step 450. In this way, persistence of the COM object is automatically controlled by the control program 228. The site disconnect may occur upon the visitor leaving the site, closing the browser or the control program 228 ending. When the visitor session is completed, the COM object disconnects from the data server 16 and the data server closes the TCP/IP session. In this way, the feedback is collected from visitors to the Web site 30 using ActiveX controls and COM objects with controlled persistence.

FIG. 12 is a flow diagram illustrating a method for controlling the persistence of a COM object in an operating environment in accordance with one embodiment of the present invention. It will be understood that the persistence of other self-decrementing objects may be similarly controlled without departing from the scope of the present invention. A self-decrementing object is an object that decrements or otherwise changes a reference count upon a Web pages change or other suitable event to allow automatic unloading from an operating environment.

Referring to FIG. 12, the COM object is loaded into an operating environment. In a particular embodiment, the operating environment is the Microsoft Internet Explorer which employs the use of ActiveX or Internet-enabled COM objects. The COM object is loaded by Microsoft Internet Explorer with the Web pages and sets the reference count of all objects to one.

Proceeding to step 482, the reference count for the COM object is internally incremented to two or other suitable values greater than one. At step 484, when Microsoft Internet Explorer navigates to another page, objects for the new page are loaded and the reference count for all previously loaded components are reduced by one and are unloaded from the operating environment if the reference count has a value of zero. Because the reference count for the COM object was incremented to a value greater than one at step 482, its reference count remains greater than zero at step 484 during navigation of a Web site or sites 30 and is not unloaded from the operating environment.

Proceeding to step 486, the reference count of the COM object is internally decremented to a value of zero upon an occurrence of a specified event, such as leaving a Web site or terminating a browsing session. At step 488, the COM object is automatically unloaded from the operating environment by Microsoft Internet Explorer. Thus, the COM object is programmed to maintain persistence in the operating environment across a plurality of Web pages and to automatically unload upon the occurrence of the specified event. As a result, when and how a COM object is unloaded may be exactly controlled.

Though the present invention has been described with several embodiments, various changes in modifications may be suggested to one skilled in the art. It is intended that the present invention encompass such changes and modifications as fall within the scope of the appended claims.

What is claimed is:

1. A method for monitoring browsing activity of a visitor to a Web site, comprising;

loading a client program into an operating environment of a client machine of a visitor to a Web site;

artificially incrementing a reference count associated with the client program to maintain persistence of the client program in the operating environment during browsing by the visitor across a plurality of Web pages of the Web site;

monitoring client browsing activity of the visitor across the Web pages with the client program;

uploading an indication of the browsing activity of the visitor over a network for processing; and decrementing the reference count upon a Web pages chance for automatic unloading of the client program from the operating environment of the client machine.

2. The method of claim 1, wherein the client program comprises a self-decrementing object and the reference count is a reference count for the self-decrementing object.

3. The method of claim 1, wherein the client program comprises a component object model (COM) object and the reference count is a reference count for the COM object.

4. The method of claim 1, wherein the client program comprises an Active X control.

5. The method of claim 1, wherein the reference count is incremented to a value greater than one.

6. The method of claim 5, further comprising:

decrementing the reference count to zero upon a specified event; and automatically unloading the client program from the operating environment of the client machine upon a zero reference count.

7. A client-side program for monitoring the browsing activity of a visitor to a Web site, comprising:

a medium; and logic encoded on the medium, the logic operable to run in an operating environment of a client machine of a visitor to a Web site, artificially increment a reference count associated with the program to maintain persistence of the program during browsing activity of the visitor across a plurality of Web pages of the Web site, monitor browsing activity of the visitor across the Web pages, upload an indication of the browsing activity over a network for processing, and decrement the reference count upon a Web pages change for automatic unloading of the program from the operating environment of the client machine.

8. The client-side program of claim 7, wherein the logic comprises a self-decrementing object and the reference count is a reference count for the self-decrementing object.

9. The client-side program of claim 7, wherein the logic comprises a component object model (COM) object and the reference count is a reference count for the COM object.

10. The client-side program of claim 7, wherein the program comprises an Active X control.

11. The client-side program of claim 7, the logic operable to increment the reference count to a value greater than one.

12. The client-side program of claim 11, the logic further operable to decrement the reference count to zero upon a specified event and automatically unload the program from the operating environment of the client machine upon a zero reference count.

13. A monitoring program for monitoring the activity of a visitor to a Web site from a client machine of the visitor, comprising:

means for artificially incrementing a reference count associated with the monitoring program to maintain persistence of the monitoring program in an operating environment of the client machine during browsing activity of the visitor across a plurality of Web pages of the Web site;

means for monitoring browsing activity of the visitor across the Web pages with the monitoring program;

means for uploading an indication of the browsing activity over a network for processing; and means for decrementing the reference count upon a Web pages chance for automatic unloading of the monitoring program from the operating environment of the client machine.

14. The monitoring program of claim 13, wherein the monitoring program comprises a self-decrementing object and the reference count is a reference count for the self-decrementing object.

15. The monitoring program of claim 13, wherein the monitoring program comprises a component object model (COM) object and the reference count is a reference count for the COM object.

16. The monitoring program of claim 13, wherein the monitoring program comprises an Active X control.

17. The monitoring program of claim 13, wherein the reference count is incremented to a value greater than one.

18. The monitoring program of claim 13, further comprising:

means for decrementing the reference count to zero upon a specified event; and means for automatically unloading the monitoring program from the operating environment of the client machine upon a zero reference count.

19. A method for controlling the persistence of a component object model (COM) object downloaded over the Internet and loaded into an operating environment of a client machine, comprising:

artificially incrementing an internal reference count of the COM object to a value greater than one to maintain persistence of the COM object in an operating environment of the client machine during browsing activity across a plurality of Web pages; and decrementing the internal reference count to zero upon a Web pages change for automatic unloading of the COM object from the operating environment of the client machine.

20. The method of claim 19, wherein the persistence of the COM object in the operating environment is maintained across a plurality of Web sites.

21. The method of claim 19, wherein at least one of the Web pages is associated with a first Web site and at least one of the Web pages is associated with a second Web site distinct from the first Web site.

* * * * *